United States Patent [19]
Anderson et al.

[11] 3,862,914
[45] Jan. 28, 1975

[54] WATER-BASED COATINGS FROM POLYEPOXIDES AND POLYCARBOXYLIC ACID MONOANHYDRIDES

[75] Inventors: Ronald W. Anderson, Pittsburgh; Richard C. McAfee, Wexford, both of Pa.

[73] Assignee: Mobil Oil Corporation, New York, N.Y.

[22] Filed: Nov. 1, 1972

[21] Appl. No.: 302,708

[52] U.S. Cl............260/29.2 EP, 117/132 BE, 260/29.1 SB, 260/29.3, 260/29.4 R, 260/33.2 EP, 260/47 EA
[51] Int. Cl... B32b 15/08, B32b 27/00, C08g 30/12
[58] Field of Search... 260/29.2 EP, 47 EA, 33.2 EP

[56] References Cited
UNITED STATES PATENTS

| 3,355,401 | 11/1967 | Tanner | 260/29.2 EP |
|---|---|---|---|
| 3,370,969 | 2/1968 | Powell et al. | 260/23 EP |
| 3,397,159 | 8/1968 | Slater et al. | 260/29.2 EP |
| 3,563,929 | 2/1971 | Guldenpfennig | 260/29.2 EP |
| 3,624,013 | 11/1971 | Sekmakas | 260/29.2 EP |
| 3,627,720 | 12/1971 | Hinton et al. | 260/29.2 EP |
| 3,634,326 | 1/1972 | Aubry et al. | 260/47 EA |
| 3,730,926 | 5/1973 | Guldenpfennig | 260/29.2 EP |

FOREIGN PATENTS OR APPLICATIONS

| 1,039,793 | 8/1966 | Great Britain | 260/29.2 EP |
|---|---|---|---|

*Primary Examiner*—Murray Tillman
*Assistant Examiner*—Arthur H. Koeckert
*Attorney, Agent, or Firm*—Charles A. Huggett

[57] ABSTRACT

Water-based coating compositions are provided by reacting an hydroxy functional polyepoxide with a polycarboxylic acid monoanhydride, preferably trimellitic anhydride, in organic solvent medium at critical concentration, and at critical temperature to produce a non-gelled acidic resin which is dispersible in water with the aid of a base.

17 Claims, No Drawings

WATER-BASED COATINGS FROM POLYEPOXIDES AND POLYCARBOXYLIC ACID MONOANHYDRIDES

The present invention relates to water-based coating compositions having film properties comparable to those obtained from organic solvent solution. The invention particularly contemplates coatings useful for sanitary can coating including linings for beer cans.

In accordance with this invention, an hydroxy functional resinous polyepoxide, especially those having a 1,2-epoxy equivalency of from about 1.4 to about 2 is reacted with a polycarboxylic acid monoanhydride, preferably containing at least one carboxyl group in addition to the single anhydride group, such as trimellitic anhydride, to produce a non-gelled resin which is dispersible in water with the aid of a base. The reaction conditions are critical since, normally, polyepoxides and monoanhydrides such as trimellitic anhydride react rapidly and uncontrollably to produce an insoluble gel which is useless for either solvent or water based coating.

The reaction conditions used in this invention require a liquid phase reaction in organic solvent solution having a resin solids content of between about 50% and about 85%, preferably from 55 to 80%. The system is not economical at low solids content and, above 85% solids, the reaction is uncontrollable, producing undesired gelation. When the proper solvent content is selected, it becomes possible to conduct a controllable reaction if the reaction temperature is appropriately selected to be within the range of about 100° C. to about 125° C. Below 100° C., the reaction is too slow and, by the time 130° C. is reached, the reaction is so rapid that an insoluble gelled product is produced in about 10–20 minutes.

In this invention, the anhydride functionality is reactive with the hydroxy functionality in the polyepoxide and the epoxy functionality of the polyepoxide is reactive with the carboxyl functionality in the polycarboxylic monoanhydride, both of these reactions being low temperature addition reactions. In addition, as the epoxy groups of polyepoxide react, additional hydroxy groups are generated and, at the same time, as the anhydride group reacts, additional carboxyl functionality is generated. As a result, the tendency for gelation is self-evident as well as being well known. However, and under the reaction conditions involving the presence of organic solvent in the proportions noted and the utilization of reaction temperatures within the range specified and in the absence of extraneous catalyst, such as alkaline catalysts which stimulate the epoxy-carboxy addition reaction, undesired gelation is avoided and a practical non-gelled acidic resin is obtained.

The organic solvent solution of acidic resin is then at least partially neutralized with a base, preferably a nitrogenous base, such as ammonium hydroxide or an amine, such as triethyl amine, or the like. The use of bases to neutralize acidic resins and render them water dispersible is itself conventional. However, the final pH of the aqueous dispersion which is produced should be within the range of from about pH 6 to about pH 10, preferably from pH 7 to pH 9.5. At a pH below 6, the resin does not disperse in the water. Curiously, at a pH in excess of about 10, the resin tends to precipitate in a few hours.

It would appear that under the reaction conditions described herein, the carboxyl functionality of the polycarboxylic acid monoanhydride (either present initially or generated by anhydride reaction or both) does not fully react so that, after the anhydride functionality has been substantially completely consumed as is intended, a portion of the carboxyl groups are still unreacted, providing an acidic reaction product having an acid number of at least about 10, preferably at least about 15. This unreacted carboxyl functionality is relied upon for salt formation with a base in order to provide the water dispersibility which is desired. Generally speaking, greater acidity is required in the reaction product as the molecular weight of the polyepoxide increases and as the desired particle size of the water dispersed particles is smaller. Preferred acidity is represented by an acid number in the range of 50–150.

Water soluble or water dispersible formaldehyde condensates, including phenol-formaldehyde condensates and aminoplast resins are desirably employed to provide a cure capacity and thereby enable the coating composition to thermoset on baking. When the coatings are baked more vigorously than 1 minute at a temperature of 450° F. or 8 minutes at 400° F., then the coatings thermoset in the absence of these formaldehyde condensates, but they are desirably present since they speed the cure and enhance the final properties of the cured coatings.

Illustrative heat-hardening formaldehyde reaction products which can be used are hexamethoxy methyl melamine, and water dispersible transesters thereof produced by partially ethylating the same. Water soluble urea-formaldehyde condensates and also water dispersible phenol-formaldehyde condensates are useful. These formaldehyde addition products are broadly useful in amounts of from 0.5 to 50%, based on the total weight of resin, preferably in amounts of 2–40%. It will be appreciated that carboxyl-functional aminoplasts and phenoplasts are also known, and these are dispersible in water with the aid of a base and are also useful in this invention.

It is convenient to add the formaldehyde condensates in solution in water miscible organic solvent such as isopropanol, 2-butoxy ethanol or 2-ethoxy ethanol, and then more water is added to maintain the weight ratio of water to organic solvent at a minimum of 80/20, to thereby minimize the solvent content of the system.

Referring more particularly to the polyepoxides which are utilized in this invention, it is preferred to employ polyglycidyl ethers, especially those having a 1,2-epoxy equivalency of from about 1.4 to about 2, preferably from 1.8 to 2.0. The molecular weight of the polyepoxide is also subject to considerable variation, but polyepoxides having a molecular weight of at least 300 up to about 10,000 are useful, preferred molecular weight being from about 350–4,000. The polyepoxide should have an hydroxyl value of at least about 0.1 equivalent per 100 grams of polyepoxide.

In preferred practice, the ratio of epoxy functionality in the polyepoxide to carboxyl functionality in the monoanhydride (the anhydride group is computed as two carboxyl groups) is in the range of 2:1 to 2:16. The final epoxy value is preferably in the range of 0.02–0.07 equivalents per 100 grams of resin.

The polyglycidyl ethers which are preferably employed and which are desirably diepoxides, are used in the form of polyglycidyl ethers of dihydric phenols, especially bisphenols, such as bisphenol A. The term "bisphenol" identifies a pair of phenolic groups linked together through an intervening divalent aliphatic group, such as an alkylene group.

Epoxy functionality in excess of 2 is not preferred because of the tendency toward gelation. However, and since the reaction in this invention is dominated by the hydroxy-anhydride reaction which goes to substantial completion, exposy functionality in excess of 2 can be tolerated when all of the other factors tending to cause gelation are minimized. Thus, using a dicarboxylic acid anhydride in minimum proportion with a polyepoxide of low hydroxyl functionality enables a higher functional polyepoxide, such as Epon 1031, to be used. Also, solids content and reaction temperature should also be minimized within the ranges previously defined.

It will be appreciated that the water dispersing properties will vary depending in part on the molecular weight of the polyepoxide which is utilized for reaction with the polycarboxylic acid monoanhydride. At the lower molecular weights, the reaction appears to form almost a true solution. On the other hand, and as molecular weight is increased above about 1,000, the products will range from colloidal solutions to emulsions, depending on the proportion of anhydride. With Epon 1007, for example, 3 grams of trimellitic anhydride per 100 grams of epoxy yields an emulsion. Increasing the trimellitic anhydride to 6 grams yields a colloidal solution.

The polycarboxylic acid monoanhydrides which are employed are particularly illustrated by trimellitic anhydride which contains a single carboxyl group in addition to the single anhydride group. It is not essential that the monoanhydride include at least one carboxyl group since succinic anhydride with its lower functionality still provides acceptable products. However, trimellitic anhydride provides a definite advantage since the water dispersed products exhibit superior compatibility with modifying resins such as the formaldehyde condensates noted hereinbefore. Dianhydrides are not useful since these lead to an uncontrollable gel upon reaction with the polyepoxide.

Other polycarboxylic acids which may be used herein are illustrated by alpha-(2-carboxyethyl)-glutaric anhydride which is tricarboxylic as is preferred, and by pyromellitic monoanhydride, which is less preferred. Other less preferred monoanhydrides which are dicarboxylic are illustrated by adipic anhydride, phthalic anhydride, and maleic anhydride.

The proportion of the polycarboxylic acid monoanhydride will vary considerably depending upon the molecular weight of the polyepoxide, it being well known that these polyepoxides include increasing hydroxy functionality as they possess higher molecular weight. Broadly, the polycarboxylic acid monoanhydride, illustrated by trimellitic anhydride, will vary from about 2 to about 35 parts of the anhydride per 100 parts of the polyepoxide reactant. However, using high molecular weight polyepoxides such as Epon 1007 or Epon 1009, which are diglycidyl ethers of bisphenol A having a molecular weight of 2900 and 3750, respectively, only 2 to about 20 parts of trimellitic anhydride can be used. With lower molecular weight polyepoxides such as Epon 836, the proportion of anhydride will range from about 25 to 35 parts of anhydride per 100 parts of the polyepoxide. Correspondingly, polyepoxides of intermediate molecular weight will require intermediate proportions of the anhydride.

The organic solvents which may be utilized are subject to wide variation so long as the solvent is inert with respect to the polyepoxide and anhydride reactants and is sufficiently water miscible so as not to interfere with the subsequent dispersion of the acidic resin solution in water. Illustrative water miscible solvents, in addition to those noted hereinbefore, are methyl ethyl ketone, methyl isobutyl ketone, and the like, the class of inert water miscible organic solvents being well known.

In addition to the organic solvent which is required to be present during the reaction between the polyepoxide and the anhydride, other water miscible solvents may be added after the reaction is complete and prior to dispersal in water, even though such solvents may not be inert. Solvents of this type are illustrated by hydroxy functional solvents such as isopropanol or 2-butoxy ethanol.

As will be appreciated, the organic solvents which are present in the final aqueous coating composition will affect the drying and flow characteristics of the resin coating, factors which are of only secondary significance to this invention.

After the acidic resin solution has been prepared and the solvents appropriately balanced, the base is desirably added, and then deionized water is stirred in until the desired aqueous dispersion is obtained. These actions can be conducted at about room temperature, or elevated temperature (60°–90° C.) can be used to handle the higher viscosities which may be encountered when the acidic resin is produced at higher resin solids content.

The water dispersions of this invention will desirably possess a resin solids content of from 15 to 40% by weight, for ordinary application by roll coat, spray, or brush, but lower solids content may be employed with other application technique and higher solids content may be feasible, especially when molecular weight is minimal or when the ratio of water to organic solvent is decreased.

Baking to cure the coatings may be carried out at a temperature of from 250° to 600° F. for periods of from 1 hour at the lower temperature to a few seconds at the highest temperature. Usually, temperatures of from 325° to 650° F. are used for from 30 minutes to about 10 seconds.

The coatings may be clear or pigmented and various agents may be added to minimize foaming or control flow or provide lubricity, or the like, as is conventional.

The invention is illustrated in the examples which follow, in which all parts are by weight unless otherwise indicated.

EXAMPLE 1

Using a three-neck flask equipped with a charging port, a reflux condenser and mechanical agitator, charge 2,200 grams of a 75% solids solution of Epon 836 in methyl isobutyl ketone, 600 grams of trimellitic anhydride, and 200 grams of methyl isobutyl ketone to maintain a 75% solids charge. Under agitation, heat to 120° C. and hold at 120°–125° C. for 40 minutes to obtain an epoxy value of 0.05–0.07 and an acid number of 100–120. Cool the product to 90° C. with addition of 750 grams 2-butoxy ethanol and apply vacuum to remove solvent and increase the solids to 75% (remove 750 grams methyl isobutyl ketone). During the solvent removal step, the temperature must not exceed 95° C. The batch is then diluted with 750 grams of isopropanol and discharged at 70° C.

blend 100 grams of the above product, at room temperature, and 8 grams of 26° Baume ammonium hydroxide and stir until uniform. Under continued agitation, add 170 grams deionized water. The resultant material is clear, contains 21.5% resin solids, and has a solvent composition of 82/9/9 water/2-butoxy ethanol/isopropanol.

EXAMPLE 2

Using the equipment of Example 1, the following product was produced:

| Item | Material | Charge (Grams) |
|---|---|---|
| 1 | Epon 1007 (weight per epoxide equivalent=2000) | 1100 |
| 2 | Methyl isobutyl ketone | 367 |
| 3 | Trimellitic anhydride | 70.4 |
| 4 | 2-butoxy ethanol | 780 |
| 5 | NH$_4$OH (26° Baume') | 44 |
| 6 | Deionized Water | 3506 |

Procedure:
1. Charge items 1 and 2, with agitation. Heat to 122° C. while dissolving item 1.
2. Charge item 3 at 122° C., hold for 2 hours at 122°-125° C.
3. At 2 hour completion, add item 4, cool to 90° C.
4. Vacuum distill 367 grams methyl isobutyl ketone, temperature not to exceed 120° C. At this point, resin will have Acid No. 29-31 and an epoxy value of 0.025-0.030.
5. Cool batch to 90° C.
6. Add item 5 dissolved in 10% of item 6; stir until uniform.
7. Add remaining item 6, stir until uniform while cooling to 25° C. discharge at 25° C.

Resultant finish is clear and contains 21.3% resin solids with a solvent composition of 82/18 water/2-butoxy ethanol.

This solution applied as a film weighing 3-4 mg./in$^2$ and baked 8 minutes at 400° F. provides a film which is solvent resistant (passes 20 double rubs with a methyl ethyl ketone saturated cloth).

EXAMPLE 3

Using the equipment of Example 1, the following product was produced:

| Item | Material | Charge (Grams) |
|---|---|---|
| 1 | Epon 1007 (weight per epoxide equivalent=2000) | 1650 |
| 2 | Methyl isobutyl ketone | 550 |
| 3 | Trimellitic Anhydride | 49.5 |
| 4 | 2-butoxy ethanol | 567 |
| 5 | NH$_4$OH | 30.6 |
| 6 | Deionized Water | 3372 |

Procedure:
1. Charge items 1 and 2, with agitation. Heat to 122° C. while dissolving item 1.
2. Charge item 3 at 122° C., hold for 3 hours at 122°-125° C.
3. At completion of 3 hour hold, add item 4, cool to 90° C.
4. Vacuum distill 550 grams methyl isobutyl ketone from reactor, temperature not to exceed 120° C. during solvent removal. Batch now at 75% nonvolatile with an acid value of 14-16 and an epoxy value of 0.030 to 0.035.
5. Cool batch to 90° C.
6. Add item 5, premixed with 10% of item 6, and stir until uniform.
7. Add remainder of item 6 while stirring until uniform. Cool to 25° C. and discharge.

The resultant finish is semi-translucent, white emulsion containing 30.0% resin solids with solvent composition of 86/14 water/2-butoxy ethanol.

A coating of this solution tested as in Example 2 passes 10 double rubs with a methyl ethyl ketone saturated cloth.

EXAMPLE 4

The coating composition of Example 2 was applied at 3.5 mg./sq. in. on tin-free steel, 0.25 lb. 95 lb. basis weight tinplate, and aluminum and baked 8 minutes at 400° F. To provide better flow, a silcone flow control agent may optionally be included in an amount of 1 gram per 400 grams of solution, but this is not essential. The silicone flow control agent is entirely conventional and is illustrated by the product BYK 300 (BYK-Gulden Inc.).

EXAMPLE 5

Modify 400 grams of the product of Example 2 with 1 gram of a silicone flow control agent and 2 grams of hexamethoxy methyl melamine. This coating was then applied as in Example 4, with one set of panels baked 8 minutes at 400° F. and a duplicate set baked in a high velocity air oven for 10 seconds at 625° F. A film produced as in Example 2 passes 50 methyl ethyl ketone double rubs.

Modifying the present example by increasing the proportion of hexamethoxy methyl melamine to provide a ratio of 85 parts of resin to 15 parts of melamine causes a further increase in solvent resistance so that the film passes 100 methyl ethyl ketone double rubs. This film also exhibits increased hardness as a result of the increased content of the melamine resin, fitting it for use where abrasion resistance is required. It is stressed that the presence of the trimellitic anhydride has considerably modified the system because, without the trimellitic anhydride, the film would not possess the desired abrasion resistance.

All panels from Examples 4 and 5 were subjected to resistance to steam processing (90 minutes at 250° F.) and also evaluated for flexibility as is necessary to permit the seaming of can ends onto can bodies. For this evaluation, the commerical controls were an 80/20 epoxy/urea formaldehyde condensate dissolved in organic solvents and a 70/30 epoxy/heat-hardening phenol-formaldehyde condensate dissolved in organic solvents.

Perfect performance was demonstrated by all coatings, including the controls, when subjected to the steam processing test, there was no loss of adhesion nor any change in the appearance of the films in either the liquid or the vapor phase.

On the flexibility test the following ratings were observed.

| Coatings | Seaming Rating |
| --- | --- |
| Epoxy/urea-formaldehyde-solvent based | 7 |
| Epoxy/phenol-formaldehyde-solvent based | 4 |
| Example 4 | 8 |
| Example 5, 8 minute bake | 7 |
| Example 5, 10 second bake | 7 |

(10=perfect; 0=complete failure)

change in physical appearance at the end of this test cycle. After an 8 minute bake at 400° F., the film passed 80 double rubs with a methyl ethyl ketone saturated cloth, and passed process testing 90 minutes at 250° F. with no loss of adhesion and no blushing.

In addition to the foregoing examples, typical properties obtained by the various reactions described herein are illustrated in the table which follows.

TYPICAL REACTION RATIOS

| Base Epoxy Resin | Normal Range of Epoxy Value | Epoxy Value Used | Epoxide Equivalent (g/group) | Wt. of Trimellitic Anhydride[1] | Equivalent Wt. Ratio (epoxy/TMA) | Reaction Acid Value | Product Epoxy Value |
| --- | --- | --- | --- | --- | --- | --- | --- |
| Epon 836 | 0.300–0.345 | 0.320 | 312 | 30 | 2.00/2.92 | 95–105 | 0.050–0.070 |
| Epon 1007 | 0.040–0.050 | 0.044 | 2275 | 3.0 | 2.00/2.13 | 14–16 | 0.030–0.035 |
| | | 0.044 | 2275 | 6.4 | 2.00/4.55 | 29–31 | 0.025–0.030 |
| | | 0.044 | 2275 | 8.5 | 2.00/6.04 | 38–40 | 0.025–0.030 |
| | | 0.044 | 2275 | 20.6 | 2.00/14.63 | 95–105 | 0.020–0.025 |
| Epon 1009 | 0.025–0.040 | 0.032 | 3130 | 1.5 | 2.00/1.47 | 7–8 | 0.030–0.035 |
| | | 0.032 | 3130 | 3.0 | 2.00/2.94 | 14–16 | 0.030–0.035 |
| | | 0.032 | 3130 | 6.0 | 2.00/5.87 | 29–31 | 0.020–0.025 |

[1] grams per hundred of epoxy resin.

The seaming rating is the film integrity after double seaming a can end onto a can body.

The above table illustrates that the products of the invention are at least equivalent to typical products in commerce. They have the added advantage of a major reduction in the amount of organic solvent that is discharged into the air during baking.

EXAMPLE 6

Using the equipment of Example 1, 500 grams of 2-ethoxyethyl acetate and 1,635 grams of Epon 1009 were charged and under heat and agitation the temperature was raised to 120° C. to dissolve the epoxy resin. While maintaining the temperature at 120° C., 200 grams of succinic anhydride were added and the reaction continued at temperature for 1 hour. At this point, 725 grams of ethylene glycol monobutyl ether were added. The resultant product had a total solids of 58.4%, an acid number of 62 and an epoxy equivalent of 0.016.

EXAMPLE 7

Example 6 was repeated except the succinic anhydride weight was reduced to 125 grams. At the completion of the run, the product had a total solids of 60.3%, an acid number of 39 and an epoxy equivalent of 0.023.

EXAMPLE 8

Example 6 was repeated except that Epon 1007 was used in place of Epon 1009 and the succinic anhydride weight was reduced to 50 grams. At completion, the product has a total solids of 57.7%, an acid number of 25 and an epoxy equivalent of 0.043.

EXAMPLE 9

200 grams of the product of Example 8, 21 grams of hexamethoxy methyl melamine, 2.6 grams of 26° Baume ammonium hydroxide and 230 grams of water were stirred together to produce a coating material in emulsion form. This coating was applied on tinplate panels at a coating weight of 4 mg./sq. in. and baked 8 minutes at 400° F. The coated metal was tested for resistance to water attack by immersion for 45 minutes in water at 170° F. There was no loss of adhesion or It is desired to stress that the modification of the polyepoxide by the polycarboxylic acid monoanhydride in accordance with this invention, induces self-curing characteristics, reduces the amount of any formaldehyde condensate which may be desired to enhance curing capacity, provides a water reducible system, and enables the provision of aqueous coatings having superior wetting characteristics.

The invention is defined in the claims which follow.

1. A method of producing a non-gelled acidic resin from an hydroxy functional resinous polyepoxide having an alcoholic hydroxyl value of at least about 0.1 equivalents per 100 grams and a tricarboxylic acid monoanhydride, comprising heat reacting said polyepoxide having a 1,2-epoxy functionality of from about 1.4 to about 2 with said anhydride in organic solvent solution having a solids content in the range of from about 50 to about 85%, said solvent being water miscible and inert with respect to the reactants, said heat reaction being carried out at a temperature of from about 100° C. to about 125° C. in the absence of a basic catalyst and said anhydride being present in an amount of from about 2 to about 35 parts by weight per 100 parts of said polyepoxide to provide an acidic resin having an acid number of at least about 10 and an epoxy value in the range of 0.02–0.07 equivalents per 100 grams, said tricarboxylic monoanhydride and said polyepoxide reacting to produce a gel at temperatures above about 125° C. and producing undesired gelation at the temperature range specified when the concentration is above about 85%.

2. A method as recited in claim 1 in which said anhydride is trimellitic anhydride.

3. A method as recited in claim 2 in which the resin solids content is from 55 to 80%.

4. A method as recited in claim 1 in which said polyepoxide and said monoanhydride are used in amounts providing an epoxy to carboxy ratio in the range of 2:1 to 2:16.

5. A method as recited in claim 1 in which said solvent is a ketone.

6. A solution of acidic resin dispersible in water with the aid of a base, said acidic resin being the non-gelled reaction product produced by the method of claim 1, said acidic resin being substantially free of unreacted anhydride groups and having an acid number of at least about 10 and being dissolved in water-miscible organic solvent.

7. A solution as recited in claim 6 in which said acidic resin has an acid number in the range of 50-150.

8. A solution as recited in claim 6 in which said anhydride is trimellitic anhydride.

9. A solution as recited in claim 6 in which said polyepoxide is a polyglycidyl ether of a bisphenol having a molecular weight in the range of 300 up to about 10,000.

10. A solution as recited in claim 9 in which said polyepoxide has a molecular weight in the range of 350-4,000.

11. A solution as recited in claim 6 in which said solvent comprises an ether alcohol.

12. A solution as recited in claim 6 in which water soluble or water dispersible heat-hardening formaldehyde condensation product is present in said solution.

13. A solution as recited in claim 12 in which said heat-hardening formaldehyde condensate is an aminoplast resin present in an amount of from 0.5-50%, based on the weight of total resin.

14. A water dispersion comprising the solution of claim 6 dispersed in water with the aid of a base, said dispersion having a pH of from about pH 6 to about pH 10.

15. A water dispersion as recited in claim 14 in which said base is a nitrogenous base.

16. A water dispersion comprising the solution of claim 12 dispersed in water with the aid of a nitrogenous base, said dispersion having a pH of from pH 7 to pH 9.5.

17. A method as recited in claim 1 in which said polyepoxide is a polyglycidyl ether having a molecular weight in the range of 300 up to about 10,000.

* * * * *